(12) United States Patent
Shuck et al.

(10) Patent No.: US 11,788,170 B2
(45) Date of Patent: *Oct. 17, 2023

(54) PRECIOUS METALS RECOVERY

(71) Applicant: STILLWATER MINING COMPANY, Billings, MT (US)

(72) Inventors: Dave Shuck, Billings, MT (US); Jerry Kolstad, Billings, MT (US); Mark Rapkoch, Laurel, MT (US); Grenvil Marquis Dunn, Gauteng (ZA)

(73) Assignee: Stillwater Mining Company, Billings, MT (US)

( * ) Notice: Subject to any disclaimer, the term of this patent is extended or adjusted under 35 U.S.C. 154(b) by 820 days.

This patent is subject to a terminal disclaimer.

(21) Appl. No.: 16/423,960

(22) Filed: May 28, 2019

(65) Prior Publication Data

US 2019/0284659 A1 Sep. 19, 2019

Related U.S. Application Data

(63) Continuation of application No. 15/138,770, filed on Apr. 26, 2016, now Pat. No. 10,316,388, which is a
(Continued)

(51) Int. Cl.
| | |
|---|---|
| *C22B 3/12* | (2006.01) |
| *C22B 11/00* | (2006.01) |
| *C22B 3/42* | (2006.01) |
| *C22B 3/44* | (2006.01) |
| *C22B 3/14* | (2006.01) |
| *C22B 3/10* | (2006.01) |

(Continued)

(52) U.S. Cl.
CPC ............. *C22B 11/04* (2013.01); *C22B 3/10* (2013.01); *C22B 3/12* (2013.01); *C22B 3/14* (2013.01); *C22B 3/165* (2013.01); *C22B 3/22* (2013.01); *C22B 3/42* (2013.01); *C22B 3/44* (2013.01); *C22B 11/06* (2013.01); *Y02P 10/20* (2015.11)

(58) Field of Classification Search
CPC .......... C22B 11/04; C22B 11/06; C22B 3/12; C22B 3/14; C22B 3/165; C22B 3/42; C22B 3/44; Y02P 10/20
USPC ........................................................ 75/744
See application file for complete search history.

(56) References Cited

U.S. PATENT DOCUMENTS

| | | |
|---|---|---|
| 2,726,141 A | 12/1955 | Appell |
| 2,954,276 A | 9/1960 | Hazen |

(Continued)

FOREIGN PATENT DOCUMENTS

| | | |
|---|---|---|
| CA | 2480229 | 10/2003 |
| CA | 2507370 | 6/2004 |

(Continued)

OTHER PUBLICATIONS

Dickert, "Ion Exchange," Kirk-Othmer Encyclopedia of Chemical Technology, vol. 14, 2010, 50 pages.
(Continued)

*Primary Examiner* — Jie Yang
(74) *Attorney, Agent, or Firm* — Sheridan Ross P.C.

(57) ABSTRACT

Discloses a hydrometallurgical process and system for the recovery of precious metals; specifically palladium, rhodium, and platinum metals, at high purity and with limited waste and environmental fouling.

16 Claims, 7 Drawing Sheets

Related U.S. Application Data continuation of application No. 13/976,576, filed as application No. PCT/US2012/067635 on Dec. 3, 2012, now Pat. No. 9,347,113.

(60) Provisional application No. 61/566,596, filed on Dec. 2, 2011.

(51) Int. Cl.
*C22B 3/16* (2006.01)
*C22B 3/22* (2006.01)
*C22B 11/06* (2006.01)

(56) References Cited

U.S. PATENT DOCUMENTS

| | | | |
|---|---|---|---|
| 3,251,646 | A | 5/1966 | Alon et al. |
| 3,997,337 | A | 12/1976 | Pittie et al. |
| 4,012,481 | A | 3/1977 | Baltz et al. |
| 4,163,046 | A | 7/1979 | Illis et al. |
| 4,283,224 | A | 8/1981 | Stewart |
| 4,390,366 | A | 6/1983 | Lea et al. |
| 4,615,731 | A | 10/1986 | Thomas et al. |
| 5,238,662 | A | 8/1993 | Dubrovsky |
| 5,607,619 | A | 3/1997 | Dadgar et al. |
| 5,616,168 | A | 4/1997 | Gabb et al. |
| 5,785,736 | A * | 7/1998 | Thomas .................... C22B 3/08 75/744 |
| 7,563,420 | B2 | 7/2009 | Usui et al. |
| 7,857,888 | B2 | 12/2010 | Niisawa et al. |
| 7,935,173 | B1 | 5/2011 | Thomas et al. |
| 9,347,113 | B2 | 5/2016 | Shuck et al. |
| 10,316,388 | B2 | 6/2019 | Shuck et al. |
| 2007/0022843 | A1 | 2/2007 | Bax et al. |
| 2011/0165041 | A1 | 7/2011 | Horst et al. |
| 2011/0229366 | A1 | 9/2011 | Luederitz et al. |
| 2013/0276284 | A1 | 10/2013 | Brosseau et al. |
| 2014/0000413 | A1 | 1/2014 | Shuck et al. |

FOREIGN PATENT DOCUMENTS

| | | |
|---|---|---|
| CN | 101260469 | 9/2008 |
| CN | 101476044 | 7/2009 |
| GB | 787296 | 12/1955 |
| GB | 1195887 | 6/1970 |
| GB | 1521787 | 8/1978 |
| GB | 1533542 | 11/1978 |
| JP | H03-13531 | 1/1991 |
| JP | H06-240376 | 8/1994 |
| JP | 2002-212650 | 7/2002 |
| WO | WO 2004/090178 | 10/2004 |
| WO | WO 2011/161597 | 12/2011 |

OTHER PUBLICATIONS

International Search Report for International Patent Application No. PCT/US12/67635, dated Feb. 11, 2013, 1 page.
International Preliminary Report on Patentability for International Patent Application No. PCT/US12/67635, dated Nov. 14, 2013, 8 pages.
Official Action for ARIPO Patent Application No. AP/P/2014/007733, dated Oct. 27, 2017 5 pages.
Official Action for Canada Patent Application No. 2,857,687, dated Jun. 23, 2015 4 pages.
Official Action for Canada Patent Application No. 2,857,687, dated Apr. 18, 2016 6 pages.
Official Action for Canada Patent Application No. 2,857,687, dated Jan. 10, 2017 4 pages.
Official Action for Canada Patent Application No. 2,857,687, dated Sep. 27, 2017 3 pages.
Extended European Search Report for European Patent Application No. 12853388.2, dated Oct. 9, 2015, 8 pages.
Official Action for European Patent Application No. 12853388.2, dated Sep. 20, 2017 10 pages.
Official Action for U.S. Appl. No. 13/976,576, dated May 27, 2015 9 pages.
Notice of Allowance for U.S. Appl. No. 13/976,576, dated Jan. 21, 2016 5 pages.
Official Action for U.S. Appl. No. 13/929,636, dated Mar. 31, 2015 15 pages.
Official Action for U.S. Appl. No. 15/138,770, dated Mar. 7, 2018, 21 pages.
Official Action for U.S. Appl. No. 15/138,770, dated Sep. 14, 2018 7 pages.
Notice of Allowance for U.S. Appl. No. 15/138,770, dated Jan. 14, 2019 9 pages.
Notice of Allowance for Canada Patent Application No. 2,857,687, dated Nov. 15, 2018 1 page.

* cited by examiner

PRECIOUS METALS RECOVERY

CROSS REFERENCE TO RELATED APPLICATION

This application is a divisional of U.S. patent application Ser. No. 15/138,770, filed Apr. 26, 2019, and issued as U.S. Pat. No. 10,316,388, which is a continuation of U.S. patent application Ser. No. 13/976,576, filed Jun. 27, 2013, which is a national stage application under 35 U.S.C. 371 of PCT Application No. PCT/US2012/067635 having an international filing date of Dec. 3, 2012 which designated the United States, which PCT application claimed the benefit of priority to U.S. Provisional Patent Application No. 61/566,596, filed Dec. 2, 2011. The entire disclosures of each of these priority documents are hereby incorporated by reference.

TECHNICAL FIELD

The invention relates to processes useful in the recovery of precious metals from a feed stream of mixed metals, salts and other deritus.

BACKGROUND OF INVENTION

Processes for the recovery of precious metals, and particularly platinum group metals, continue to be developed and refined. These processes, however, often suffer in both quantitative and qualitative efficiency due to impurities and interfering metals, salts and, ions, in the feed stream that are not sufficiently separated from the target metal species.

A hydrometallurgical process for the recovery of precious metals selected from platinum [Pt], palladium [Pd], rhodium [Rh], ruthenium [Ru], iridium [Ir], osmium [Os] and gold [Au] from basic metals in an acidic aqueous halide solution is described in U.S. Pat. No 7,935,173, which is incorporated herein, by reference. In that process, substituted quaternary ammonium salts are used to precipitate platinum group metal(s) for separation. This process suffers however, from significantly low recovery of the target precious metals, in both quantitative and qualitative terms, in instances in which a feed stream containing lead, iron, nickel, selenium, tellurium, sulfur, arsenic, or combinations of these compounds is present.

Thus, there is a need for a precious metals recovery process sufficiently robust to provide quantitative and qualitative recovery in the presence of such impurities as interfering metals, salts and, ions, including specifically lead, iron, nickel, selenium, tellurium, sulfur, arsenic, or combinations of these compounds is present.

SUMMARY

These and other needs are addressed by the various aspects, embodiments, and configurations of the present disclosure.

The object of the invention is the provision of a precious metals recovery process wherein base metals complexes are altered sufficiently to cations so that they can be quantitatively removed on an ion exchange resin.

Another object of the invention is such process wherein precious metals are essentially anionic and do not load on the ion exchange media and pass through the resin bed at very high blended purity.

Another object of the invention is such process wherein silver, ruthenium, lead, tellurium, selenium, arsenic and sulfur are low in solubility and do not dissolve and remain in a residue after rendering the base metals cationic and the precious metals anionic.

Another object of the invention is such process wherein the metalloids consisting of selenium, tellurium, arsenic and sulphur are rendered insoluble and report quantitatively to a recovery stream by the addition of small quantities of barium salt (e.g. barium hydroxide).

Another object of the invention is any of these processes wherein chlorine gas and water can be added to the residue from which ruthenium and any osmium present is distilled substantially quantitatively, and separated from the precious metal(s).

Another object of the invention is such process in which gold is leached along with any residual platinum group metals such that gold can be recovered using, for example, an ion exchange process.

Another object of the invention is any of these processes, wherein any tellurium, selenium, sulfur, arsenic can be recovered in a mild caustic leach to remove them from the circuit.

Another object of the invention is any of these processes, wherein any ruthenium, tellurium, selenium, gold, selenium, arsenic, sulfur not recovered can be recycled to an earlier stage, so as to minimize loss.

Another object of the invention is any such process whereby lead can be removed as lead chloride with low levels of precious metal loss.

These and other advantages will be apparent from the disclosure of the aspects, embodiments, and configurations contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

Unless otherwise noted, all component or composition levels are in reference to the active portion of that component or composition and are exclusive of impurities, for example, residual solvents or by-products, which may be present in commercially available sources of such components or compositions.

All percentages and ratios are calculated by total composition weight, unless indicated otherwise.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

One embodiment of this disclosure provides a method for recovering at least one precious metal from a precious metal containing stream, the method comprising removing at least a portion of a contaminant, wherein the contaminant comprises lead, nickel and combinations thereof, from a basic metal concentrate stream to form a resulting stream;

removing at least a portion of a second contaminant from the resulting stream, wherein the second contaminant is selected from the group consisting of selenium, sulfur, arsenic and combinations thereof, to form a partially purified stream;

subjecting the partially purified stream to a leach to produce a leached stream;

removing at least one basic metal from the leached stream, wherein the at least one basic metal is selected from the group consisting of lead, silver, nickel, copper, iron, cobalt, bismuth, chromium, gold, ruthenium and combinations thereof, to form a precious metal containing stream; and, adding a substituted quaternary amine to the precious metal containing stream to recover at least one precious metal from the precious metal containing stream.

Another embodiment of this disclosure provides a system to recover precious metals, the system comprising:

a leach chamber, wherein the leach chamber is capable of receiving a first stream and combining the first stream with an acid to produce a leached stream;

a first solid liquid separator, wherein the first solid liquid separator separates solids from the leached stream to produce a screened leached stream;

an evaporator, wherein the screened leached stream is subjected to a temperature between about 60° C. to about 130° C. in the evaporator to produce a evaporated stream;

at least one temperature chamber, wherein the evaporated stream is subjected to a temperature between about 80° C. to about 160° C. in the at least one temperature chamber to produce a baked stream;

a second solid liquid separator, wherein the second solid liquid separator separates solids and liquids in the baked stream to produce a solids stream and a liquid stream; and a cation ion exchanger, wherein the cation ion exchanger receives the liquid stream, and wherein anionic materials pass through the cation ion exchanger.

Another embodiment of this disclosure provides a method of recovering a precious metal from a stream, the method comprising:

providing a stream to a leach chamber, wherein the leach chamber receives the stream and subjects the stream to a leach in an acid to produce a leached stream;

providing the leached stream to a first solid liquid separator, wherein the leached stream passes through the first solid liquid separator to produce a first solids stream and a first liquid stream;

providing the first liquid stream to an evaporator, wherein the temperature of the evaporator is between about 60° C. to about 130° C. to produce a heated first liquid stream;

providing the heated first liquid stream to at least one bake chamber, wherein the temperature of the at least one bake chamber is between about 80° C. and about 160° C. to produce a baked stream;

providing the baked stream to a second solid liquid separator, wherein baked stream passes through the second solid liquid separator to produce a second liquid stream and a second solids stream; and providing the second liquid stream to a cation ion exchanger to produce a precious metal stream.

Another embodiment of this disclosure provides a method to recover at least one precious metal from a precious metal stream, the method comprising:

providing the precious metal stream, a substituted quaternary amine and a second acid to a boiling chamber, wherein the temperature of the boiling chamber is at least about 60° C. to produce a boiled stream; and providing the boiled stream to a fourth solid liquid separator to produce a fourth solids stream and a fourth liquid stream.

Another embodiment of this disclosure provides a system to recover at least one precious metal from a precious metal stream, the system comprising:

a boiling chamber, wherein the boiling chamber receives the precious metal stream, a substituted quaternary amine and a second acid, and wherein the temperature of the boiling chamber is between about 20° C. to about 200° C. to produce a boiled stream; and a fourth solid liquid separator, wherein the fourth solid liquid separator receives the boiled stream and produces a fourth solids stream and a fourth liquid stream.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DESCRIPTION OF EMBODIMENTS

The present invention is drawn to a hydrometallurgical process and system for the recovery of precious metals, specifically palladium, rhodium, and platinum metals, at high purity and with limited waste and environmental fouling.

The term "basic metal" is used throughout this description. It should be understood that the term "basic metal" refers not only to the transition metals in the periodic table, not including precious metals, but also includes metals which may be present in the basic metal concentrate that would be considered an impurity within the precious metals.

The term "precious metal" refers to platinum group metals and gold. Platinum group metals include platinum, palladium, rhodium, ruthenium, osmium, and iridium.

Figure 1:
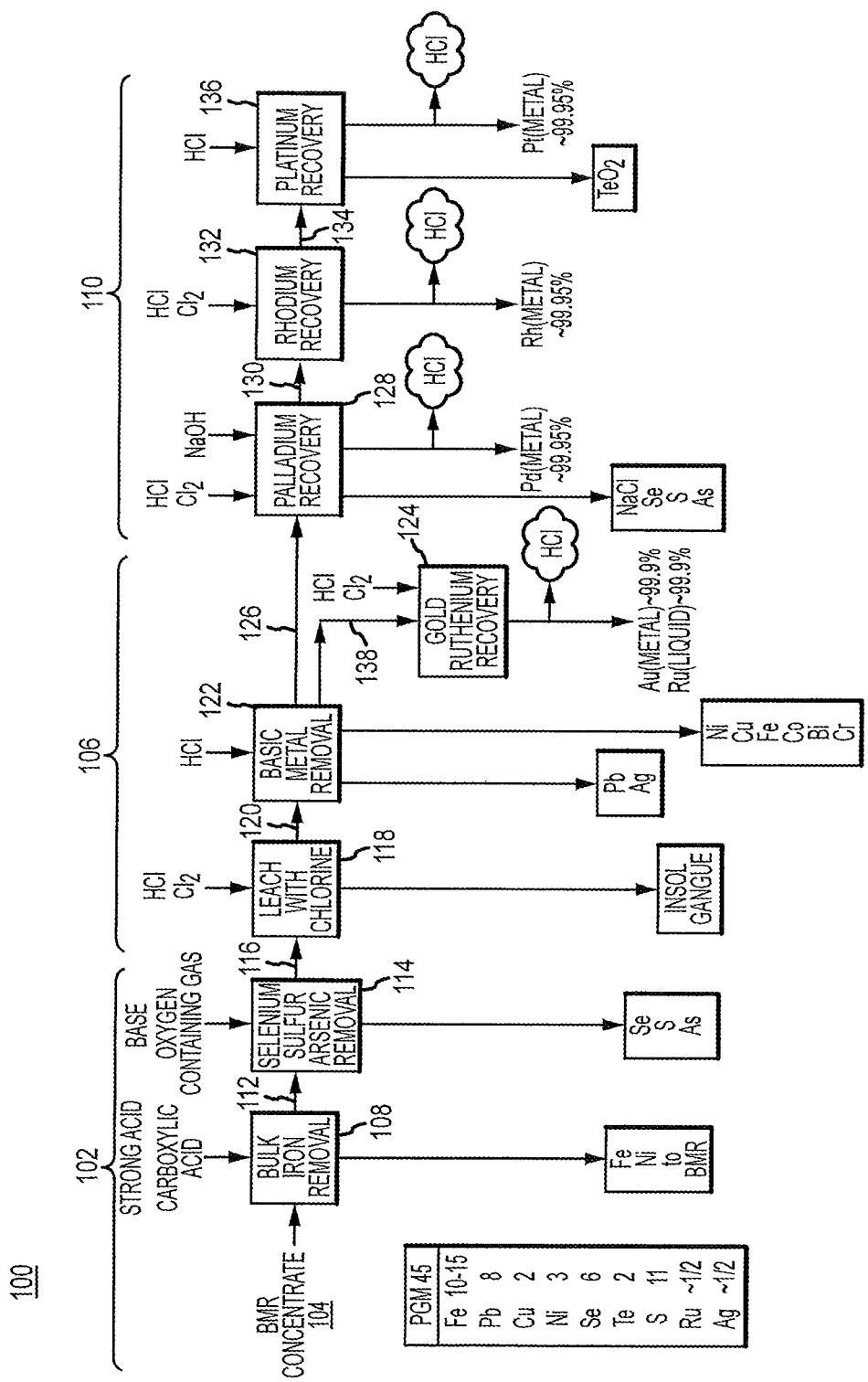
FIG. 1 shows an overall process diagram for several processes of the present invention.

FIG. 1 is an exemplary method and system 100 in which the present invention may be used. Initially, bulk basic metals are removed as shown in the process section 102. Basic metal (BMR) concentrate stream 104 is processed to remove bulk iron and/or nickel 108. The BMR concentrate stream 104 comprises lead, iron, copper, nickel, selenium, tellurium, sulfur, ruthenium, silver and platinum group metals, including palladium, platinum and rhodium. The concentrations of the materials in the BMR concentrate stream 104 comprises between about 20% to about 70% of platinum group metals, preferably at least about 45% of platinum group metals; between about 2% to about 15% of lead, preferably at most about 8% lead; between about ½% to about 10% of copper, preferably at most about 2% copper; between about ½% to about 10% of nickel; preferably at most about 3% nickel; between about ½% to about 10% of selenium; preferably at most about 6% selenium; between about ½% to about 6% of tellurium; preferably at most about 2% tellurium; between about 2% to about 20% of sulfur, preferably at most about 11% sulfur; between about 0% to about 4% of ruthenium, preferably at most about ½% ruthenium; and between about 0% to about 3% silver; preferably at most about ½% silver. Trace amounts of additional basic metals may be present in some embodiments in BMR concentrate stream 104. Any process known in the art may be used to remove the iron. For example, a strong acid and a carboxylic acid, such as sulfuric acid and formic acid (methanoic acid) respectively, may be added to the BMR concentrate stream 104 resulting in iron and/or nickel being removed from the BMR concentrate stream 104. The iron and/or nickel may be retained in a base metal refinery. The resulting stream 112 can then be processed to remove selenium, sulfur and arsenic 114. Any suitable method may be used to remove selenium, sulfur and/or arsenic. For example, a base, such as sodium hydroxide, and an oxygen containing gas, such as oxygen gas may be added to the stream 112 to remove selenium, sulfur and/or arsenic. The partially purified stream 116 can then be processed to recover certain precious metals and remove other materials.

Several processing steps occur during the precious metal recovery process in system 106. Additional basic metals may also be removed. Stream 116, which had previously been processed to remove basic metals, enters the chlorine leach 118 where it is leached with chlorine gas and hydrochloric acid. Insoluble materials, such as silica may also be removed. Stream 120 can be processed to remove additional basic metals 122. An strong acid, such as hydrochloric acid, may be added to remove additional basic metals which may include any one of lead, silver, nickel, copper, iron, cobalt, bismuth, and chromium. Gold and ruthenium may be removed in the gold and ruthenium stream 138, which may be further processed in a recovery process 124 to recover gold and ruthenium. Gold and ruthenium may be recovered at a purity of greater than about 95% for each material. Preferably, gold and ruthenium are each recovered at a purity of about 99.9%. The hydrochloric acid may be recovered using any process known in the art, including distillation, and may be recycled within the system 100.

The primary platinum group metals palladium, platinum and rhodium may be recovered with additional processing steps that occur during the platinum metals recover process and system 110. Stream 126 has negligible amounts of basic metals and other contaminants and may be processed in a palladium recovery process 128 to recover palladium using a strong acid, such as hydrochloric acid, a source for a gas, such as a chlorine gas, and a base, such as sodium hydroxide. The exiting stream 130 can be processed for rhodium recovery in the rhodium recovery process132, then stream 134 can be processed for platinum recovery in the platinum recovery process 136.

Figure 2:
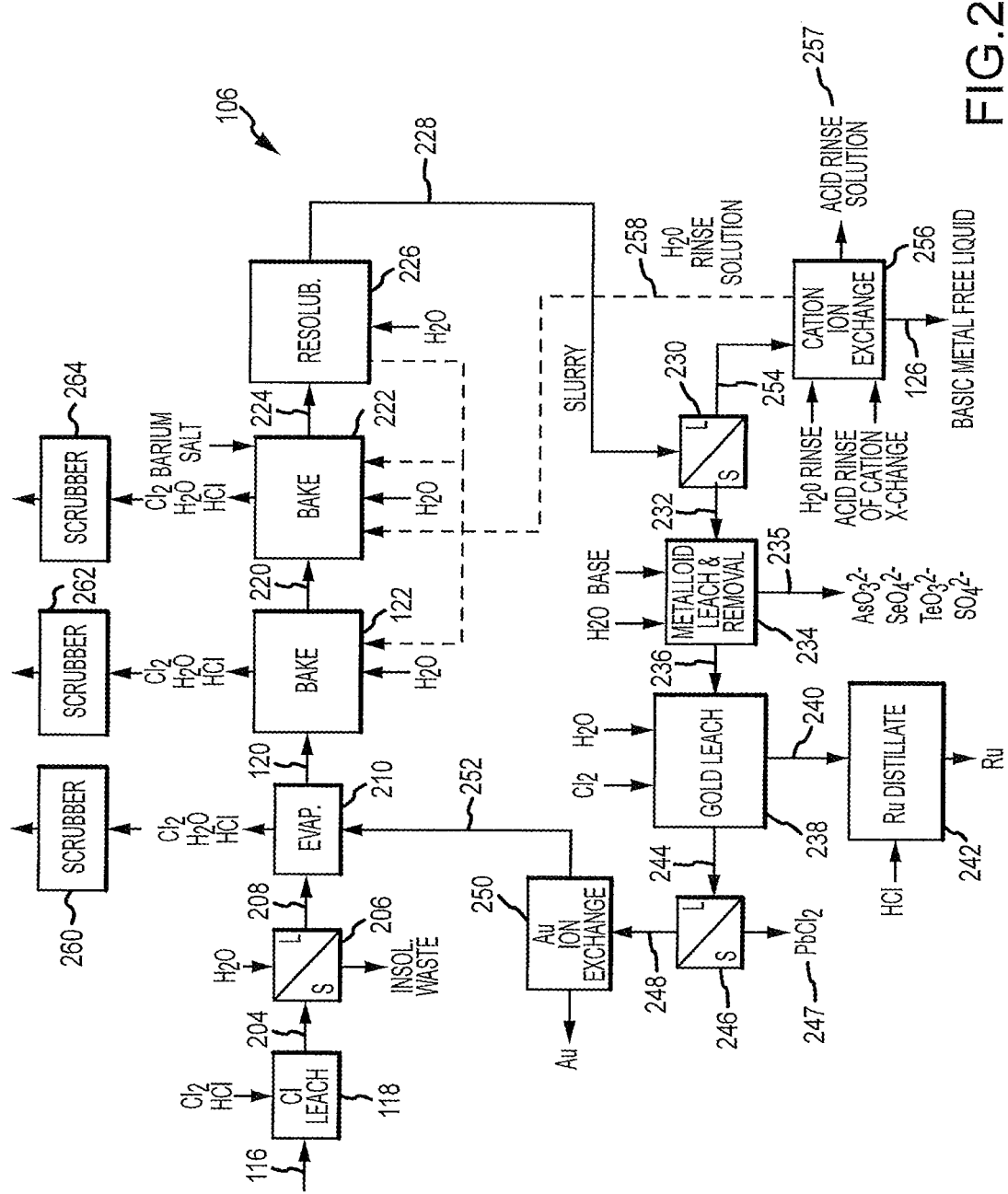
FIG. 2 shows a process diagram for a process of the present invention for purification/pretreatment of a precious metal feed material.

The process steps of the precious metal recovery process and system 106 are shown in greater detail in FIG. 2. Basic metal complexes are altered sufficiently to provide cation complexes that load quantitatively on a cation exchanger 256. Since platinum group metals are retained in anionic form in the boil and bake process, they do not load on the cation exchanger 256. Rather, the platinum group metals pass through the cation exchanger 256 forming a basic metal free stream 126, where the platinum group metals are at very high blended purity. One skilled in the art would understand that some trace amounts of basic metals may remain in the basic metal free stream 126 without compromising the recovery of the platinum group metals. Other materials, including gold, ruthenium, lead, tellurium, selenium and arsenic are low in solubility and do not dissolve in the resolubalizaiton 226. This low solubility may be achieved in part with the addition of, for example and preferably, a barium or strontium salt, such as barium hydroxide. The insolubility of these elements allow for the elements to be removed in solid liquid separator 230 where the elements are in the solids 232. Furthermore, gold may be leached, processed and collected using the precious metal recovery process 106. Additionally, ruthenium may be distilled and collected using the precious metal recovery process 106. Lead may also be removed with low levels of precious metal loss. Arsenic, tellurium, selenium and sulfur may be recovered following a mild caustic leach. The precious metal recovery process 106 may also utilize a barren liquid stream 252 whereby streams are recycled within the process to decrease loss of the precious metals, ruthenium, tellurium, selenium, gold, selenium, arsenic and sulfur. The precious metal recovery process and system 106, used therein, is discussed in greater detail with reference to FIG. 2.

Though the term chamber is used throughout the description, it should be understood that a chamber may be any container, body, tube or suitable means whereby the process conditions may be exposed to the material or process stream.

Ranges are set forth in this specification. It is understood that any value within the range may be used, even through not explicitly listed. Thus, if the range is between about 1 to about 10, a value of about 9 is disclosed even through it is not explicitly listed. Furthermore, a range that is encompassed by the larger range is also disclosed. Thus, a range of about 2 to about 8 is also disclosed even though not explicitly listed.

At various points in the specification, reference is made to NaCl, a substituted quaternary amine and HCl. These materials may be recycled within the system 100 and put to use in any of the sub-systems 102, 106 and 110 as desired.

Throughout the specification, reference is made to removing a material, compound or component from a stream or during a process, or in a system. As is understood by those skilled in the art, the term "removed" may be interpreted as a reduction in the material, compound or components. Some of the material, compound or component may remain in the stream or in the system/process.

With reference to FIG. 2, stream 116, which was previously processed to remove bulk basic metals (FIG. 1, process steps 102), is fed into a chlorine pressure leach chamber 118. Chlorine gas can be consumed on demand. Hydrochloric acid between about 6N to about 10N, preferably about 6N hydrochloric acid can be added to the leach chamber 118. The leach chamber 118 can be heated to between about 90° C. and about 140° C., in some embodiments to about 105° C. The pressure in the leach chamber 118 can be between about 0 atm to about 4 atm, in some embodiments to about 3 atm. The leach chamber 118 can be maintained at temperature and pressure for between about 1 hour to about 10 hours, in some embodiments to about 4 hours. Chlorine gas can be supplied under pressure for the duration. Following the chlorine leach, stream 204 is fed into a solid liquid separator 206 and washed with water. The solids removed in the solid liquid separator 206 may be disposed as insoluble waste or solid for their residual value. The insoluble waste may include, for example, sand, trash, stones and the like. The liquid stream 208 contains the precious metals, some basic metals that were not removed in the previous step 102. The liquid stream 208 comprises strong acid complexes of the precious metals and some basic metals, typically of the formula $H_nMCl_x$, wherein M is the metal, wherein the metal may be a precious metal or a basic metal such as Au, Pt, Pd, Ir, Rh, Co, Cu, Ru, and/or Pb. Some of the basic metal complexes are in equilibrium so that they exist as a complex or as other simple compounds as is commonly known in the art. For exemplary purposes only, the complex of copper is shown in equation 1.

$$H_2CuCl_4 \leftrightarrow 2HCl + CuCl_2 \qquad (1)$$

The liquid stream 208 is passed to an evaporator 210. The temperature of the evaporator 210 can be between about 60° C. to about 130° C., in some embodiments about 100° C. The contents remain in the evaporator 210 until the contents are substantially free of liquid. The evaporator 210 evaporates water, some chlorine gas and hydrochloric acid, which are released from the system. The hydrochloric acid may be recovered and used within the system 100, including subsystems 102, 106 and 110 as desired. The evaporation process in the evaporator 206 may be assisted by employing an evaporator designed to operate under partial vacuum, where the pressure may be maintained at between about 1 psia to about 14 psia, in some embodiments about 7 psia. Optional scrubbers 260 may be used to decrease contaminates released from the evaporator 206 and to neutralize the released gases using systems and methods commonly known in the art. Stream 120 exits the evaporator 210.

Water may be added to stream 120 and/or to chamber 122. Chamber 122 can be ramped to a temperature between about 80° C. and about 160° C., in some embodiments around 150° C. and baked to apparent dryness which in some embodiments occurs in between about 4 hours to about 50 hours, in some embodiments about 12 hours. It should be understood that the time in the chamber is dependent on the vessel size and the available heat transfer area. The pressure within chamber 122 may be as low as about 1 psia to about 14 psia, in some embodiments about 7 psia. Chlorine gas, water and hydrochloric acid are released from the chamber 122, which may be equipped with optional scrubbers 262 commonly known in the art. The hydrochloric acid may be recovered and used within the system 100, including subsystems 102, 106 and 110 as desired. Stream 220 exits the chamber 122.

FIG. 2 illustrates two chambers 122 and 222, though it is understood that this may be one chamber. Water may be added to stream 220 or chamber 122/222, which is then processed a second time in chamber 122 or passed to another chamber 222 to remove residual chlorine gas, water and hydrochloric acid. The residual gas, water and hydrochloric acid may be processed in an optional scrubber 264, which is commonly known in the art. The hydrochloric acid may be recovered and used within the system 100, including subsystems 102, 106 and 110 as desired. The operating conditions of chamber 222 may be similar to those of chamber 122. Stream 220/224 can be resolublized 226, which may occur in chamber 222, though it is understood that stream 220/224 may be resolublized 226 in chamber 122/222 or a separate chamber by adding water to stream 220/224 or to chamber 122/222/226 to create a slurry 228.

Small quantities of metalloids (Se, Te, As and S) that remain in solution after the penultimate bake in chamber 122/222 may be precipitated with small quantities of a barium salt. In some embodiments, barium hydroxide may be employed as the precipitant in quantities that do not normally exceed about 200% stoichiometric. The addition of the barium salt reduces the metalloid concentrations to below about 5 mg/L total in stream 236.

The process of baking in the chamber 122/222 and rehydrating with water can be continued until the pH of the slurry 228 is between about pH 0.5 to about pH 6, and preferably in the range of between about pH 2 to about pH 3.

The slurry 228 is processed in a solid liquid separator 230. The slurry 288 comprises the platinum group metals, and may include gold, ruthenium, silver, lead, sulfur, selenium, tellurium and/or arsenic. The separated solids 232 may also include gold, oxides of ruthenium, silver and lead as well as oxides of the metalloids sulfur, selenium, tellurium and/or arsenic. These materials are low in solubility and do not dissolve, therefore remain in the solids 232 after rendering the basic metals cationic and the platinum group metals anionic in the liquid stream 254 for processing in the cation exchanger 256. Optionally, solids 232 are exposed to a metalloid leach and removal 234 by adding a basic solution, such as sodium hydroxide, potassium hydroxide or another hydroxide. The temperature range can be between about 50° C. and about 150° C., but in some embodiments about 95° C. Oxygen is excluded from the leach and a nitrogen blanket may be employed to maintain anaerobic conditions. During the metalloid leach and removal 234, the pH can be maintained between about pH 9 and about pH 13 and in some embodiments about pH 10.5. The duration of the leach can be between about 0.2 hours and about 6 hours. In some embodiments the leach can be concluded after about one hour. In some embodiments, the contents of the metalloid leach and removal 234 are agitated during the metalloid leach and removal 234 in order to ensure excellent reagent contact with the solids. Any suitable agitation method known in the art may be used including mixing, shaking, stirring, and/or tumbling. Water can be employed to reslurry the residue from the filtration step embedded within the metalloid leach and removal 234 and the slurry 236 is passed to the gold leach 238. An optional liquid solid separator may be used following the metalloid leach 234 and prior to the gold leach 238.

Stream 235 comprises impurities $AsO_3^{2-}$, $SeO_4^{2-}$, $TeO_3^{2-}$ and $SO_4^{2-}$ that are leached during the metalloid leach and removal 234. Slurry 236 is optionally processed to recover gold and ruthenium in a gold leach 238. The gold leach 238 occurs at a pressure between about 50 kPa(A) and about 100 kPa(A), in some embodiments at about 90 kPa(A) and a temperature between about 40° C. to about 110° C., in some embodiments at about 60° C., for between about 2 hours to about 8 hours, in some embodiments for about 6 hours. Chlorine gas and water, as required, are added to the gold leach 238. Chlorine may be added until the ruthenium distillation 242 is complete.

The addition of chlorine in the presence of water with solids 236 from metalloid leach and removal 234 results in the quantitative distillation of ruthenium in stream 240 and the near quantitative dissolution of gold and any remaining precious metals. Stream 244 can be processed in a solid liquid separator 246. The solids include $PbCl_2$ 247 and are removed with low levels of platinum group metal loss. Platinum group metals (Pt, Pd, Rh, Ru, Os, and Ir) remaining are co-report with gold in stream 248 after separation in a solid liquid separator 246, but are not recovered on the gold ion exchanger resin 250. Similarly any unrecovered metalloids (Se, Te, As and S) may also be found in stream 248. The liquid stream 248 can be processed through a gold ion exchanger 250. Gold is eluted from the resin in the gold ion exchanger 250 and may be finally recovered as metal. The barren liquid stream 252 after exiting gold ion exchanger 250 may be returned to the evaporator 210.

Another benefit of processing step 106 is that there may be minimal loss of platinum group metals because streams may be reprocessed through the system 106 as shown with barren liquid stream 252.

Ruthenium may also be recovered from stream 240. Hydrochloric acid at between about 0.5N to about 10 N, in some embodiments about 6N may be added to the absorbers in the ruthenium distillate 242. Ruthenium (and any osmium co-entrained with the Ru) may be absorbed in this strong hydrochloric acid and recovered. Ruthenium and osmium may be present in stream 240. This distillation process may be continued until no further ruthenium can be displaced from the gold leach chamber 238. The lack of ruthenium in vapor stream 240 may be detected from the brown-yellow color imported to the hydrochloric acid absorbent.

The liquid stream 254 from the solid liquid separator 230 is also processed. Liquid stream 254 contains platinum group metals, basic metals as well as other materials. Specifically, the liquid stream 254 may include Pd, Rh, Pt, Ni, Cu, Fe, Cr, Ba, Co, Bi, Cd, and/or Zn, as chlorides. The liquid stream 254 can be passed through a cation exchanger 256. The anion stream 126, which comprises platinum group metals (Pt, Pd, Rh) and minimal to no basic metals, passes through the cation exchanger 256 is a basic metal free liquid anion stream containing a negligible level of basic metals still present in the stream 254, i.e. less than about 1 mg/L each of Ni, Cu, Cr, Fe, Zn, Cd, Ba, and Co The basic metal free anion stream 126 (see also FIG. 1) may be processed as described in further detail in FIG. 3. Materials left on the cation exchanger 256 are removed from the cation exchanger 256 by eluting the resin of the cation exchanger 256 with a strong acid, such as 3N HCl or 3N $H_2SO_4$, to produce an acid rinse solution 257, followed by a water rinse. The acid rinse solution 257 may be discarded as waste. The water rinse solution 258 may be returned to the liquid stream 254 or to chamber 222.

Figure 3:
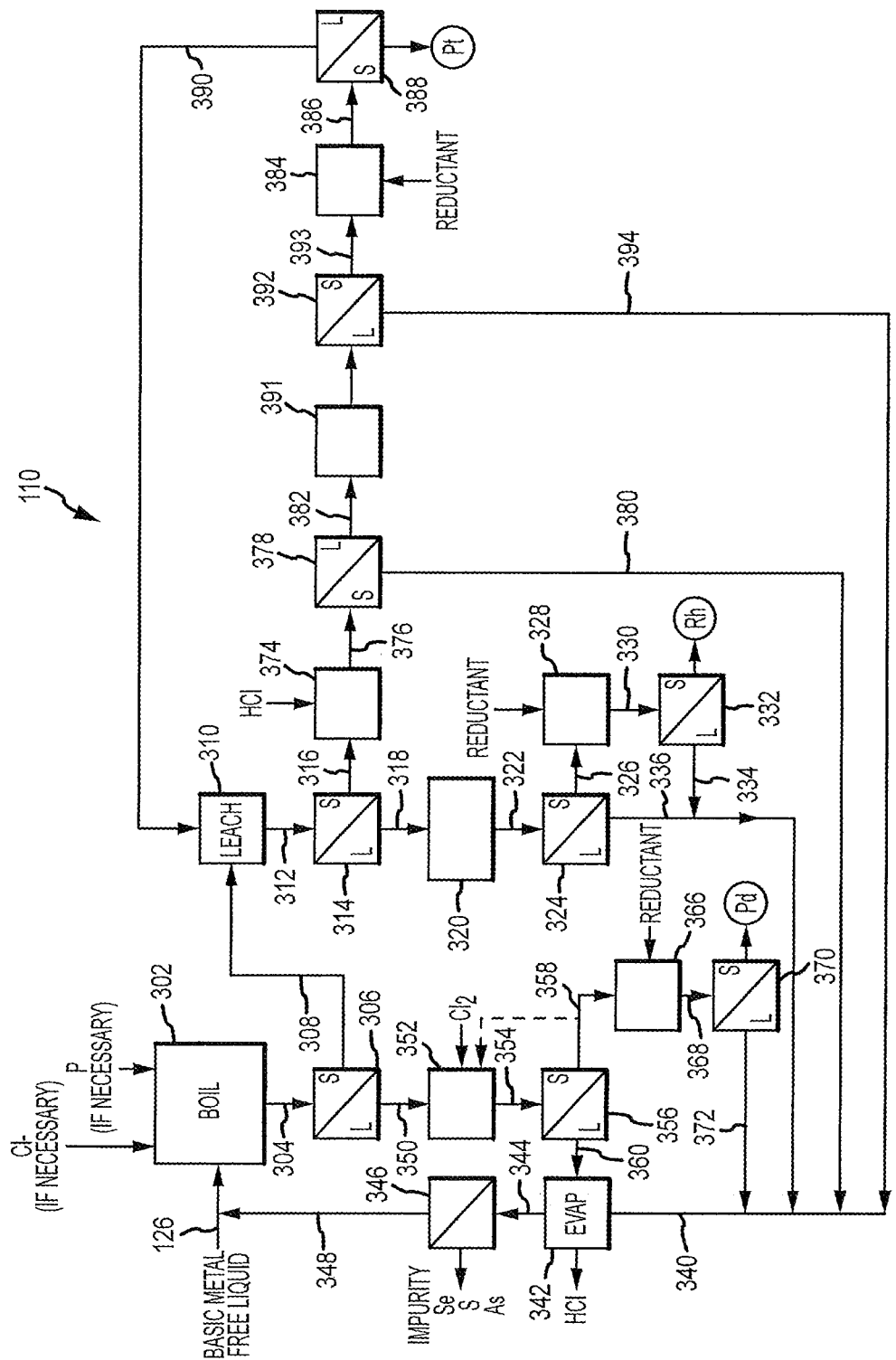
FIG. 3 shows a process diagram for a process of the present invention for recovery of platinum group metals from a feed formed in the process depicted in FIG. 2.

With reference to FIG. 3, a substituted quaternary amine can be used to complex and remove platinum group metals for recovery. The s platinum group metals include platinum, palladium and rhodium. Iridium may also be found in the platinum group metals stream and may complex with the substituted quaternary amine. The substituted quaternary amine (hereinafter "P") may be any suitable P substituted quaternary amine. For example, P may be in the form $N^+R_{4-n}H_n$ wherein n can be between 0 and 3 and R is an organic group or a proton. As is understood by a person of ordinary skill in the art, P may also be in the form of $NXR_{4-n}H_n$ wherein X is a halogen. The process and system 110 described in FIG. 3 illustrates a method and system 110 to recover platinum group metals using P. Advantageously, the process and system 110 may recycle the majority of the P, therefore reducing cost and environmental impacts. Furthermore, process and system 110 may be combined with other processes and systems as illustrated in FIG. 1.

A basic metal free anion stream can be processed to recover platinum group metals, including palladium, platinum and rhodium. In some embodiments, the basic metal anion stream can be produced in the previous metal recovery process and system 106 as stream 126. Basic metal free anion stream 126 can be fed into a chamber 302 along with P recycle stream 348. Alternatively, basic metal free anion stream 126 and P recycle stream 348 may be mixed before it enters the chamber 302. Hydrochloric acid, between about 1N and about 6N, in some embodiments approximately 4N, can be added to the chamber 302 if necessary so that there is between about 1% and about 15% excess of HCl, in some embodiments, about 6% excess of HCl. P may also be added to the chamber 302 so that a sufficient quantity exists in the chamber 302. In some embodiments, there can be between about 20 g/L to about 60 g/L of palladium in the chamber 302. P can be supplied in stoichiometric excess and may be present between about 10% and about 30%, in some embodiments about 20% excess of P is used. The amount of $Cl^-$ added, in some embodiments in the form of NaCl, can be between about 10 g/L and about 80 g/L of NaCl, in some embodiments about 60 g/L of NaCl. The solution in the chamber 302 can be boiled for between about 2 hours to about 8 hours, in some embodiments about 4 hours. During the boil, water can be evaporated to assure the target—Pd concentration is assured. The operating temperature of chamber 302 may be at least about 60° C., preferably greater than about 100° C. The chamber 302 may be cooled to between about 25° C. to about 60° C., in some embodiments about 30° C. These conditions encourage the solubility of palladium-P (in the palladous form of $P_2PdCl_4$). Platinum and rhodium containing P complexes remain insoluble. Stream 304 exits chamber 302 and can be fed into a solid liquid separator 306. Liquid stream 350 comprises palladium-P, wherein the solids 308 contain rhodium-P (in the form of $P_3RhCl_6$) and platinum-P (in the form of $P_2PtCl_6$). The solids 308 may be washed. Chlorine in the form of a gas is then added to liquid stream 350 or may be added in chamber 352 and can be reacted so that $P_2PdCl_6$ is precipitated in the oxidation process. Chamber 352 may operate at a temperature of between 20° C. to about 40° C., in some embodiments about ambient temperature for as long as required to oxidize the palladium within the chamber 352 to a valency of 4.

Stream 354 enters a solid liquid separator 356. The liquid stream 360 comprises excess P and as P—Cl may be joined to the P-recycle stream 340, which then may enter an evaporator 342 or may be used elsewhere in the system 110. Evaporator 342 may be a single evaporator, or several evaporators, suitable to accept several different streams. Optionally, the solid stream 358 may be recycled to chamber 352 after the solid stream 358 is dissolved with water. Recycling the solid stream 358 to chamber 352 increases the recovery percentage of palladium through successive crystallizations of $P_2PdCl_4$. Thereafter, stream 358 may enter chamber 366. A reductant may be added to stream 358 in chamber 366. Chamber 366 may operate between about ambient to about the boiling point. The contents are in the chamber 366 for a sufficient time to reduce the palladium concentration below about 50 ppm. Any suitable reductant may be used. In some embodiments, the reductant may be hydrogen gas or hydrazine. By way of example, hydrogen reacts with palladium-P as shown in equation 2.

$$P_2PdCl_6 + 2H_2 \xrightarrow{H_2O} 2PCl(l) + 4HCl + Pd^o(s) \qquad (2)$$

Stream 368 enters a solid liquid separator 370 and contains palladium in the form of metallic powder which exits the solid liquid separator 370 as a solid and may be recovered for further processing. The metallic palladium powder comprises between about 99.0% to about 99.99% palladium, in some embodiments at least about 99.95% palladium. Liquid stream 372 comprises P, P—Cl and HCl may be joined with recycle stream 340 which enters evaporator 342 or directly enters evaporator 342. The hydrochloric acid may be recovered and used within the system 100, including subsystems 102, 106 and 110 as desired.

The solids 308 leaves the solid liquid separator 306 and comprise rhodium-P (in the form of $P_3RhCl_6$) and platinum-P (in the form of $P_2PtCl_6$). Rhodium may be recovered from the solids 308. The solids 308 enter a leach chamber 310 and P recycle stream 390; and/or new P may be added to the chamber 310 as required. The chamber 310 may be maintained at a temperature between about 10° C. and about 40° C. and in some embodiments less than about 30° C. for between about ½ hour to about 6 hours, in some embodiments about 2 hours. The chamber 310 may be operated at atmospheric pressure. The leaching step is important to effect an acceptable separation between rhodium and platinum. Small quantities of HCl, between about 1N HCl to about 3N HCl, typically about 1N HCl, are required to solubilize the rhodium-P. Stream 312 enters a solid liquid separator 314. The liquid stream 318 comprises rhodium-P, while the solids 316 from the solid liquid separator 314 comprises platinum-P and enter a chamber 374. Hydrochloric acid can be added to chamber 374 in a concentration ranging from about 1N to about 6N HCl, in an embodiment a concentration of about 1N HCl may be adequate. The temperature in chamber 374 can be increased to between about 80° C. and about boiling point, in some embodiments the temperature can be maintained at a target temperature of approximately 95° C., for between about 0.1 hours to about 6 hours, in some embodiments about one hour. Stream 376 enters a solid liquid separator 378, which may be at the target temperature of about 95° C. Solids stream 380 comprises some P-salt and any tramp material and may enter an evaporator 342, join with a P-recycle stream 340 or may be used elsewhere in the system 110. Liquid stream 382 comprises platinum-P. In chamber 391, the platinum-P fluid can be boiled down in successive stages and after each stage the concentrated fluid can be cooled to between about 10° C. and about 50° C. in some embodiments about 30° C. and a pure platinum-P can be crystallized and filtered in the solid liquid separator 392 and processed in platinum-P solids 393. The operating temperature of chamber 391 may be at least about 60° C., in some embodiments at least about 100° C. In some embodiments, the filtering may take place while the contents are still hot prior to cooling. The contents of chamber 391 may be processed for a duration sufficient to substantially dissolve the platinum in the chamber 391. Typically this can be between about 30 minutes to about 2 hours. In some embodiments, the operating conditions of the chamber may be sufficient to reduce the concentration of platinum to below about 50 ppm. Eventually all the recovered platinum-P in the platinum-P solids 393 may be reacted in vessel 384. The reaction can be complete in 384 between about 1 hour and about 10 hours and the pressure in vessel 384 can be maintained between about 10 kPa(g) and about 1000 kPa(g), in some embodiments about 100 kPa(g). The liquid 394 comprises P and may be joined with recycle stream 340, directed to evaporator 342 or sent to another location within the system 110. The platinum-P solids 393 are reslurried in water and treated in reactor 384 with a reductant, for example, hydrogen gas or hydrazine. The reactor 384 may be a closed reactor capable of operating at between about 1 psia to about 14 psia, in some embodiments about 7 psia and at temperature between about 40° C. and about 100° C., in some embodiments about 80° C. Hydrogen gas is shown for exemplary purposes as the reductant and may be consumed on demand according to the reaction in equation 3.

$$P_2PtCl_6 + 2H_2 \rightarrow 2PCl + 4HCl + Pt \qquad (3)$$

Stream 386 enters a solid liquid separator 388. Solids exit the solid liquid separator 388 comprising platinum in the form of metallic platinum powder. The metallic platinum powder comprises between about 99.0% to about 99.99%, preferably at least about 99.95% platinum. Liquids 390 comprising P exit the solid liquid separator 388 and are recycled to chamber 310, may be recycled to stream 340, evaporator 342 or used elsewhere in the system 110. It is understood that several P recycle streams are utilized in the process and may be directed to locations as needed. For example, P recycle 336 may be recycled to chamber 310. Alternatively, P recycle 390 may be sent to evaporator 342, chamber 302, joined with other P recycle streams or used elsewhere within the system 110.

Liquids 318 exiting solid liquid separator 314 comprise rhodium-P enters chamber 320. The operating temperature of chamber 320 may be between about 20° C. to about 200° C. In chamber 320, the rhodium-P liquid 318 can be concentrated in an evaporation process and then cooled to between about 10° C. and about 50° C., in some embodiment, about 30° C., to crystallize a rhodium-P solid which can be separated from the liquid in a solid liquid separator 324. The concentration of rhodium may be between about 2 g/L and about 10 g/L. The solids 326 may be washed to remove soluble impurities.

The solids 326, comprising rhodium-P crystals, are reslurried in water and reduced in chamber 328 with the aid of a reductant, for example, hydrazine or hydrogen. Chamber 328 may operate at between about ambient to about the boiling point. The conditions of chamber 328 may reduce the concentration of the rhodium to below about 50 ppm in chamber 328. By way of example, hydrazine reacts with rhodium-P as shown in equation (4).

$$4P_3RhCl_6 + 3N_2H_4 \rightarrow 12PCl(l) + 12HCl + 4Rh°(s) + 2N_2 \quad (4)$$

As shown in equation 4, P can be liberated from the rhodium. Stream 330 enters a solid liquid separator 332. Solids exit the solid liquid separator 332 comprises rhodium in the form of metallic rhodium powder. The metallic rhodium powder comprises between about 99.0% to about 99.99% rhodium, preferably at least about 99.95% rhodium. Liquids 334 exit the solid liquid separator 332, where they may be joined with another P recycle stream, such as 336 or 340, sent to evaporator 342 or sent elsewhere in the system 110. Evaporator 342 may be maintained at a boiling temperature between about 100° C. and about 150° C., in some embodiments, about 110° C. The evaporation process may be continued until sodium chloride and P—Cl crystallize as a crystal slurry 344. The crystal slurry 344 can be discharged to separator 346. The separator 346 may be a sieve blend and/or a vac belt filter. Some hydrochloric acid may be recovered in the distillate from the evaporator 342. The crystal slurry 344 may cool to between about 30° C. and about 90° C., in some embodiments about 50° C., in separator 346. The evaporator 342 may be operated as a continuous process or as a batch process.

The crystals and most of the recycled P liquid 348 may be returned to chamber 302. A small bleed stream from separator 346 may be used to remove low levels of impurities from the system 110. The impurities may include Se, S and/or As. The small bleed stream may be sent to a precipitation process in which the platinum group metals are recovered and the selenium, sulfur, and/or arsenic remain in the liquid and pass to effluent. The bleed stream will be used as required.

EXAMPLES

The following examples are provided to illustrate certain aspects, embodiments, and configurations of the disclosure and are not to be construed as limitations on the disclosure, as set forth in the appended claims. All parts and percentages are by weight unless otherwise specified.

All inductively coupled plasma (ICP) assays were performed on a Perkin Elmer ICP 3000 instrument. Due to the masking effect high PGM concentrations have on low concentration chalcogens both radial and axial ICP curves were applied for analysis. Assays were generated by two samples; one for high concentration metals (100× dilution) and one for low concentration elements (10× dilution).

Example 1

An example will now be given of a boil and bake test as undertaken in the evaporator 210, chamber 122, chamber 222 and resolubalization 226. The result here is from a test conducted to consciously examine the effect of seven repetitions of the process. Normally only three boil and bake steps are required to achieve the required outcome.

Figure 4:
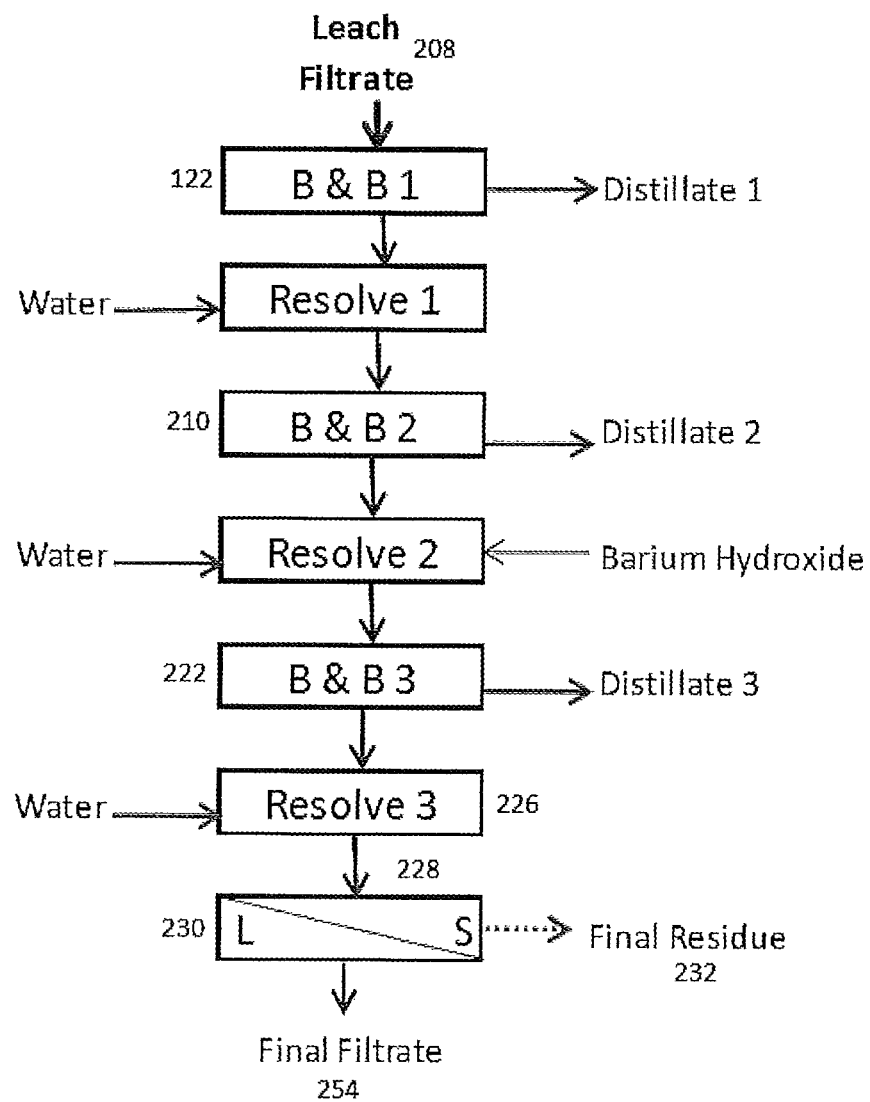
FIG. 4 illustrates a multiple boil and bake process and system components.

Liquid stream 208 was passed through a series of boil and bakes cycles in chamber 122 and chamber 222. Pure water was added after every bake in chambers 122/222 to resolubilize elements that were water soluble. Finally after the penultimate bake and during the water addition to the final bake, barium salt, in the form of barium hydroxide octahydrate, was added at the ratio of barium contained at 6% of the palladium present in the feed to the boil and bake. The last boil and bake liquid stream 254 was free of the As, S, Se and Te. FIG. 4 illustrates the multiple boil and bake process employed.

Table 1 illustrates the stream assays for the liquid stream 208, slurry 228 and solids 232. All values that appear in the stream are approximate.

TABLE 1

| | Stream Description | | |
|---|---|---|---|
| Element | Stream 208 Feed Filtrate (mg/L) | Stream 230 Final Filtrate (mg/L) | Stream 232 Final Residue (%) |
| Ag | 487 | 128 | 1.38 |
| Au | 893 | 0 | 2.92 |
| Cu | 8,115 | 14,624 | 1.21 |
| Fe | 1,381 | 210 | 0.18 |
| Ni | 4,837 | 8,906 | 0.34 |
| Pb | 13,406 | 20,605 | 9.65 |
| Pd | 54,968 | 71,935 | 55.0 |
| Pt | 27,990 | 51,436 | 3.66 |
| Rh | 2,726 | 4,952 | 0.27 |
| Ru | 321 | 9 | 1.04 |
| S | 391 | 0 | 0.15 |
| Se | 850 | 0 | 2.94 |
| Te | 1,775 | 0 | 5.94 |
| As | 702 | 0 | 2.29 |

Example 2

Figure 5:
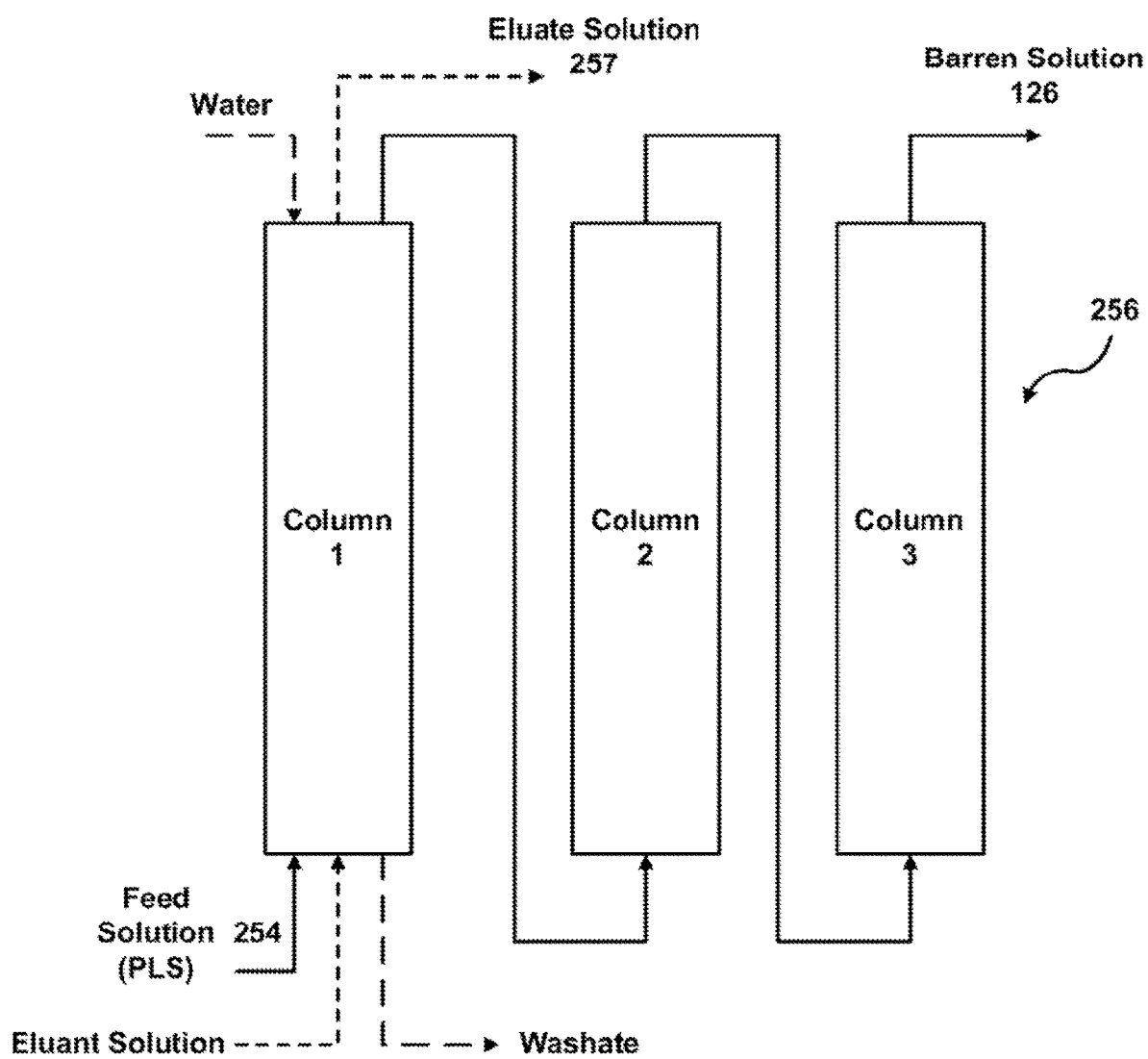
FIG. 5 illustrates a three conditioned cation resin bed.

An example will now be provided that illustrates process occurring in the cation exchanger 256. The filtrate fraction from the separator 230 was polish filtered and then fed through three conditioned cation resin beds configured as illustrated in FIG. 5. The liquid stream 254 was introduced up-flow in the first resin bed at about 5 bed volumes per hour and the barren from the lead was then introduced into the first trail column and finally the barren from the first trail column was the feed to the second trail column. Some resin shrinkage occurred in the load step. All flows were in the load step. Following the load the following steps were then conducted:

Entrainment rejection
PLS displacement
Elution 1
Elution 2
Eluent displacement

The basic metal free liquid 126 that passed out the cation exchanger 256 contained the platinum group metals (Pt, Pd and Rh). The displacement wash liquor was water and while some of this was returned to liquid stream 254 the majority of the rinse solution 258 was returned to the boil process in chamber 222. Hydrochloric acid 3N was employed in the elution of the metals that had loaded on the resin. This acid rinse solution 257 was removed from the overall flow sheet as a waste. Finally the eluent remaining in the cation exchanger 256 was displaced with water to eluent make-up. Table 2 illustrates the assays of the relevant streams for the lead-trail column system. All values that appear in the stream are approximate.

TABLE 2

| | Stream Description | | |
|---|---|---|---|
| Element | Stream 230 Feed Solution (PLS) (mg/L) | Stream 126 Basic metal free liquid (mg/L) | Stream 257 Acid rinse solution (mg/L) |
| Ag | 0 | 18 | 0 |
| Au | 0 | 0 | 0 |
| Cu | 7,366 | 0 | 8,291 |
| Fe | 574 | 0 | 539 |
| Na | 78 | 6 | 44 |
| Ni | 6042 | 0 | 7735 |
| Pb | 550 | 0 | 634 |
| Pd | 50,452 | 51,751 | 1 |
| Pt | 50,000 | 53,015 | 0 |
| Rh | 4,509 | 3,863 | 0 |
| Co | 111 | 0 | 103 |
| Zn | 27 | 0 | 45 |
| Bi | 24 | 1 | 12 |
| Cr | 20 | 8 | 20 |

Example 3

Figure 6:
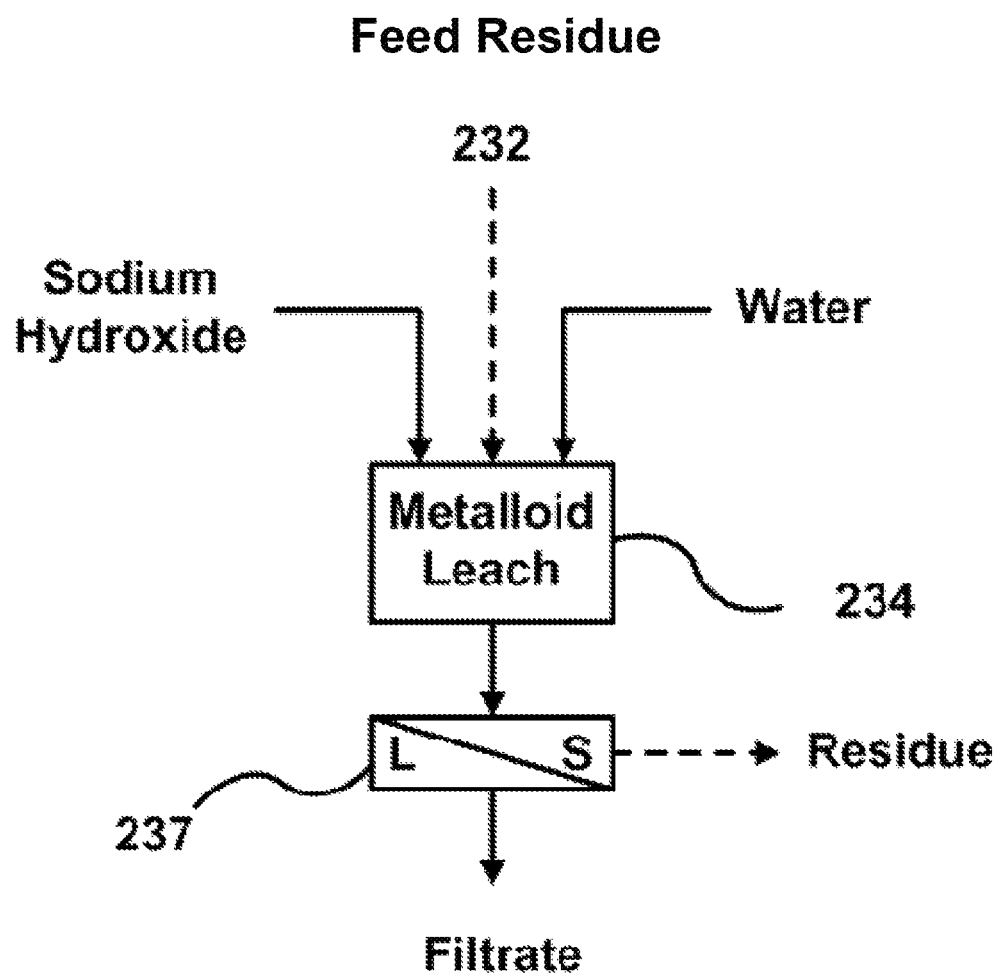
FIG. 6 illustrates a diagram and system for a metalloid leach of an embodiment of the invention.

The metalloid leach step and removal 234 will be demonstrated with the following example:

An anaerobic alkaline leach was performed on the solids 232 from the solid liquid separator 230. The solids 232 were repulped in water and heated to about 90° C., at about 20 kPa(g). A nitrogen gas blanket was maintained in the metalloid leach and removal 234 to ensure no oxygen was allowed to participate in the reaction. The pH of the metalloid leach and removal 234 was adjusted to about pH 10.6 employing sodium hydroxide in a well agitated system. The slurry density was approximately 14% solids. Sodium hydroxide was added incrementally thereafter and during the approximately two hour leach period to control the pH at approximately 11. A block flow diagram illustrating the metalloid leach and removal 234 appears in FIG. 6. Optional liquid solid separator 237 may be used following the metalloid leach 234 and prior to the gold leach 238. Relevant stream assays for the metalloid leach and removal 234 are illustrated in Table 3. All values that appear in the stream are approximate. The extractions of the key elements in this leach were about 98% sulfur; about 95% selenium; about 59% tellurium; and about 86% arsenic.

TABLE 3

| | Stream Description | | |
|---|---|---|---|
| Element | Stream 232 Feed Residue (%) | Stream 236 Metalloid Leach Residue (%) | Stream 235 Metalloid Leach Filtrate (mg/L) |
| Ag | 3.18 | 4.53 | — |
| Au | 6.65 | 9.53 | — |
| Cu | 0.1 | 0.22 | — |
| Fe | 8.3 | 11.5 | 7 |
| Na | — | 2.65 | — |
| Ni | 0.013 | 0.04 | 5 |
| Pb | 12.6 | 17.8 | — |
| Pd | 7.8 | 11.1 | 21 |
| Pt | 2.3 | 3.16 | 7 |
| Rh | 0.22 | 0.29 | — |
| Ru | 2.81 | 4.12 | — |
| Ir | 0.12 | 0.17 | — |
| S | 1.63 | 0.04 | 2,429 |
| Se | 6.4 | 0.48 | 10,381 |

TABLE 3-continued

| | Stream Description | | |
|---|---|---|---|
| Element | Stream 232 Feed Residue (%) | Stream 236 Metalloid Leach Residue (%) | Stream 235 Metalloid Leach Filtrate (mg/L) |
| Te | 11.8 | 7.56 | 8,326 |
| As | 4.83 | 1.07 | 5,251 |

Example 4

Figure 7:
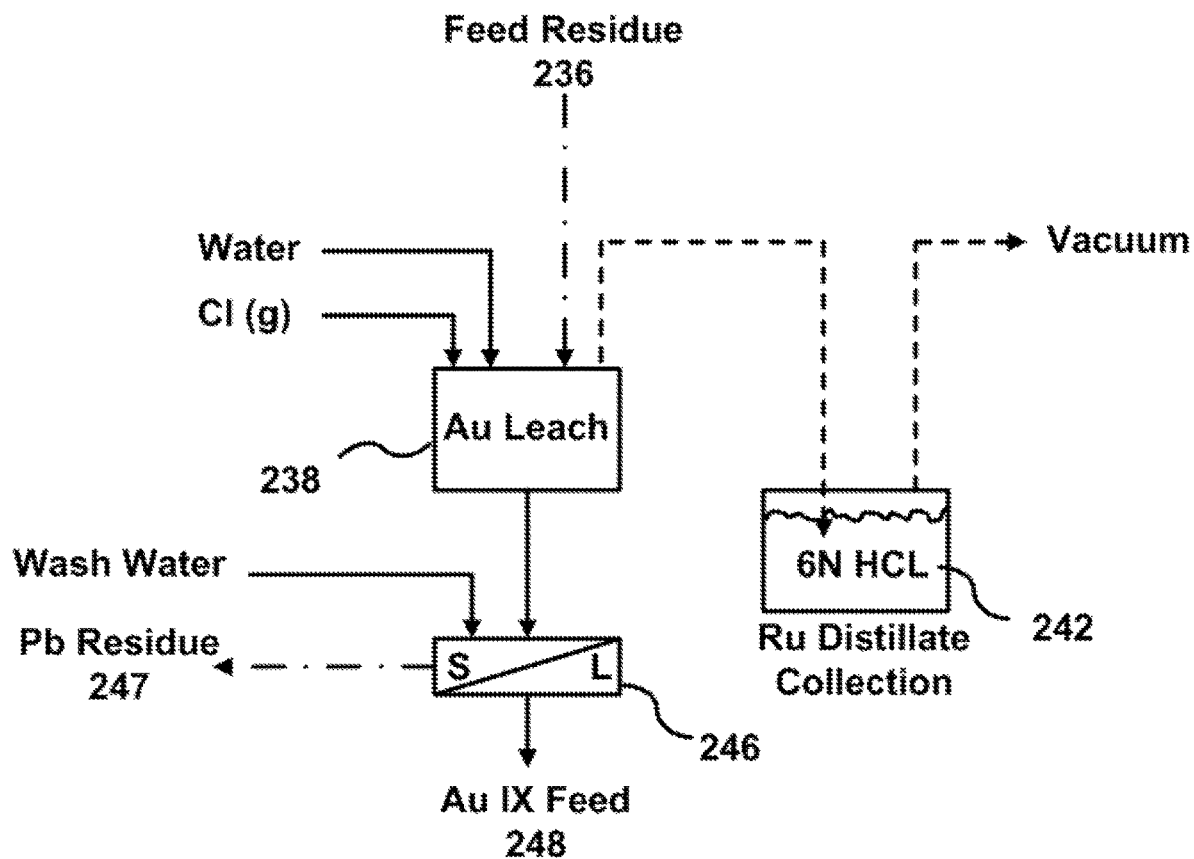
FIG. 7 illustrates a diagram and system for a gold leach of an embodiment of the invention.

The solids 236 from the metalloid leach and removal 234 was repulped in demineralized water and introduced into the gold leach 238. The gold leach 238 was coupled to an absorption flask ruthenium distillate 242. The gold leach 238 was provided with a chlorine sparge insert pipe that was able to introduce the chlorine gas below the slurry level. The gold leach 238 temperature was maintained between about 30° C. and about 60° C. Chlorine gas was added over a period of about 2.5 hours. The pressure in the reactor was slightly below ambient and was maintained by connecting the absorption flask outlet to the vacuum system. During this period ruthenium was distilled as tetroxide from the gold leach 238 and gold along with most of the other metals were almost quantitatively leached. The ruthenium in the gas phase was absorbed in a 6N hydrochloric acid adsorbent in the flask. The gold leach-end slurry 244 was filtered on a vacuum filter separator 246 and yielded a lead chloride residue and a stream 248 which became the feed to a gold ion exchange 250. FIG. 7 illustrates the gold leach 238.

The removal of ruthenium from the solids 236 was about 96%. Any ruthenium not distilled in stream 240 may be returned in the gold IX barren (stream 248) to the evaporator 210 and recycled ultimately to the gold leach 238. The assays of the relevant streams in and out of the gold leach 238 are illustrated in Table 4. All values are approximate.

TABLE 4

| | Stream Description | | | |
|---|---|---|---|---|
| Element | Stream 236 Feed Residue (%) | Stream 247 Pb Residue (%) | Ruthenium distillate 242 Ru Distillate (mg/L) | Stream 248 Au IX Feed (mg/L) |
| Ag | 0.44 | 2.68 | 0 | 33 |
| Au | 2.18 | 0 | 0 | 5,362 |
| Cu | 0 | 0 | 0 | 139 |
| Fe | 1.91 | 1.94 | 0 | 3,473 |
| Na | 0 | 0.05 | 0 | 11 |
| Ni | 0 | 0 | 0 | 11 |
| Pb | 25.89 | 82.58 | 0 | 708 |
| Pd | 18.41 | 0.54 | 0 | 40,154 |
| Pt | 1.2 | 0.15 | 0 | 2,585 |
| Rh | 0.2 | 0.15 | 0 | 381 |
| Ru | 1.37 | 0.17 | 6.483 | 67 |
| Zn | 0 | 0 | 0 | 4 |
| Bi | 0.54 | 1.49 | 0 | 313 |
| Cr | 0 | 0 | 0 | 8 |

The foregoing discussion of the disclosure has been presented for purposes of illustration and description. The foregoing is not intended to limit the disclosure to the form or forms disclosed herein. In the foregoing Description of the Embodiments for example, various features of the disclosure are grouped together in one or more, aspects, embodiments, and configurations for the purpose of streamlining the disclosure. The features of the aspects, embodiments, and configurations of the disclosure may be combined in alternate aspects, embodiments, and configurations other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed aspects, embodiments, and configurations. Thus, the following claims are hereby incorporated into this Detailed Description, with each claim standing on its own as a separate preferred embodiment of the disclosure.

What is claimed is:

1. A method comprising:
    evaporating a liquid stream comprising an alkali metal chloride and a substituted quaternary amine to form a crystal slurry in at least one evaporator maintained at a boiling temperature between 100° C. and 150° C.;
    contacting the crystal slurry with a stream comprising at least one of palladium, rhodium, and platinum and comprising negligible amounts of copper, iron, nickel, lead, cobalt, aluminum, calcium, bismuth zinc, sulfur, selenium, tellurium, arsenic, ruthenium, silver and gold.

2. The method of claim 1, further comprising:
    bleeding an impurity comprising at least one of tellurium, lead, selenium, sulfur and arsenic from the crystal slurry prior to the contacting step.

3. The method of claim 1, wherein the at least one evaporator is maintained at a boiling temperature of 110° C.

4. The method of claim 1, wherein the alkali metal chloride is NaCl.

5. The method of claim 1, wherein the crystal slurry formed in the evaporating step is discharged to a separator before contacting the crystal slurry with a stream comprising at least one of palladium, rhodium, and platinum.

6. The method of claim 5, wherein the separator is a sieve blend filter.

7. The method of claim 5, wherein the separator is a vac belt filter.

8. The method of claim 5, wherein hydrochloric acid is recovered in distillate from the evaporator.

9. The method of claim 5, wherein the crystal slurry is cooled to between 30° C. and 90° C. in the separator.

10. The method of claim 5, wherein impurities selected from selenium, sulfur, and arsenic are bleed from the separator.

11. The method of claim 1, wherein the step of contacting the crystal slurry with a stream comprising at least one of palladium, rhodium, and platinum is conducted in a chamber further comprising hydrochloric acid between 1N and 6N.

12. The method of claim 11, wherein the chamber comprises between 20 g/L to 60 g/L of palladium.

13. The method of claim 11, wherein the chamber comprises between 10 g/L and 80 g/L of NaCl.

14. The method of claim 11, wherein contents in the chamber are boiled for between 2 hours to 8 hours.

15. The method of claim 14, wherein the operating temperature of the chamber is at greater than 100° C.

16. The method of claim 14, wherein the chamber is cooled to between 25° C. to 60° C. after the step of boiling the contents.

* * * * *